United States Patent [19]

Synosky et al.

[11] Patent Number: 5,441,750
[45] Date of Patent: Aug. 15, 1995

[54] WAX-FREE CHEWING GUM WITH IMPROVED PROCESSING PROPERTIES

[75] Inventors: Steven P. Synosky, Greenbrook; Mansukh M. Patel, Downers Grove, Ill.; Michael A. Reed, Merrillville, Ind.;

[73] Assignee: Wm. Wrigley Jr. Company, Chicago, Ill.

[21] Appl. No.: 295,622

[22] PCT Filed: Mar. 2, 1993

[86] PCT No.: PCT/US93/01922

§ 371 Date: Aug. 24, 1994

§ 102(e) Date: Aug. 24, 1994

[51] Int. Cl.$^6$ ............................................. A23G 3/30
[52] U.S. Cl. ............................................. 426/3
[58] Field of Search ............................ 426/3, 4, 5, 6

[56] References Cited

U.S. PATENT DOCUMENTS

| | | | |
|---|---|---|---|
| G,386,106 | 5/1983 | Merritt et al. | 426/5 |
| 1,534,929 | 4/1925 | Dunham | 426/5 |
| 1,534,930 | 4/1925 | Dunham | 426/5 |
| 1,534,931 | 4/1925 | Dunham | 426/5 |
| 1,807,704 | 6/1931 | Pappadis | 426/3 |
| 2,078,878 | 4/1937 | Jackman | 99/135 |
| 2,265,465 | 12/1941 | Wilson | 99/135 |
| 2,289,407 | 7/1942 | Hampton | 99/135 |
| 2,782,123 | 2/1957 | Rubin | 99/141 |
| 3,161,524 | 12/1964 | Opie et al. | 99/94 |
| 3,262,784 | 7/1966 | Bucher | 99/135 |
| 3,632,358 | 1/1972 | Echeandia et al. | 99/135 |
| 3,766,165 | 10/1973 | Rennhard | 260/209 R |
| 3,843,818 | 10/1974 | Wren et al. | 426/346 |
| 3,857,965 | 12/1974 | Ream | 426/3 |
| 3,894,146 | 7/1975 | Tsuyama | 424/49 |
| 3,974,032 | 8/1976 | Harjes et al. | 195/31 R |
| 4,139,639 | 2/1979 | Bahoshy et al. | 426/3 |
| 4,150,161 | 4/1979 | Rudolph et al. | 426/3 |
| 4,187,320 | 2/1980 | Koch et al. | 426/3 |
| 4,224,345 | 9/1980 | Tezuka et al. | 426/3 |
| 4,230,687 | 10/1980 | Sair et al. | 424/22 |
| 4,352,822 | 9/1982 | Cherukuri et al. | 426/4 |
| 4,352,823 | 10/1982 | Cherukuri et al. | 426/5 |
| 4,357,355 | 11/1982 | Koch et al. | 426/4 |
| 4,359,531 | 11/1982 | Bucke et al. | 435/97 |
| 4,382,963 | 5/1983 | Klose et al. | 426/3 |
| 4,384,004 | 5/1983 | Cea et al. | 426/3 |
| 4,387,108 | 6/1983 | Koch et al. | 426/4 |
| 4,452,820 | 6/1984 | D'Amelia et al. | 426/3 |
| 4,497,846 | 2/1985 | Boursier et al. | 426/660 |
| 4,514,422 | 4/1985 | Yang et al. | 426/3 |
| 4,515,769 | 5/1985 | Merritt et al. | 424/49 |
| 4,528,206 | 7/1985 | Kastin | 426/660 |

(List continued on next page.)

FOREIGN PATENT DOCUMENTS

| | | | |
|---|---|---|---|
| 0067665 | 12/1982 | European Pat. Off. | A23G 3/30 |
| 0082670 | 6/1983 | European Pat. Off. | A23G 3/30 |
| 0236271 | 9/1987 | European Pat. Off. | A61K 9/68 |

(List continued on next page.)

OTHER PUBLICATIONS

"Fructooligosaccharides (FOS)–An All Natural, Versatile, Low–Calorie Bulking Agent", by Dr. Peter Perna, Coors Biotech, Inc. (date unknown).

"*Polymer Handbook*", Second Edition, by Bandrup & Immergut, John Wiley & Sons, Inc. (1975), pp. IV–337 to IV–375.

Raftilose, "Oligofructose", by Raffinerie Tirlemontoise S. A. and Tiense Suikerraffinaderij N. V.

"Soluble & Insoluble Bulking Agents, Prospects & Applications", by Smits and Norman, presented at IBC Bulking Agents Conference (Mar. 13, 1991).

"Textbook of Polymer Science", Second Edition, by Billmeyer, Jr., John Wiley & Sons, Inc. (1971), pp. 23–61.

L. A. Dreyfus Company -List of Known Gum Base Compositions, 7 pp., Aug. 25, 1994.

*Primary Examiner*—Jeanette Hunter
*Attorney, Agent, or Firm*—Maxwell J. Petersen; Willian Brinks Hofer Gilson & Lione

[57] ABSTRACT

A wax-free chewing gum is provided which has improved processing and chewing properties, similar to a wax-containing chewing gum, and which does not exhibit short texture. The improvement is effected by adding an incremental amount of an extender to the chewing gum. A method is also provided for making a wax-free chewing gum which has processing and chewing properties similar to a wax-containing chewing gum.

23 Claims, No Drawings

U.S. PATENT DOCUMENTS

| | | | |
|---|---|---|---|
| 4,556,429 | 12/1985 | Takazoe et al. | 127/30 |
| 4,579,738 | 4/1986 | Cherukuri et al. | 426/3 |
| 4,581,234 | 4/1986 | Cherukuri et al. | 426/3 |
| 4,587,119 | 5/1986 | Bucke et al. | 424/48 |
| 4,587,125 | 5/1986 | Cherukuri et al. | 424/48 |
| 4,597,970 | 7/1986 | Sharma et al. | 426/5 |
| 4,604,287 | 8/1986 | Glass et al. | 426/5 |
| 4,634,593 | 1/1987 | Stroz et al. | 426/5 |
| 4,671,961 | 6/1987 | Patel et al. | 426/3 |
| 4,671,967 | 6/1987 | Patel et al. | 426/658 |
| 4,681,771 | 7/1987 | Adachi et al. | 426/658 |
| 4,683,138 | 7/1987 | Glass et al. | 426/5 |
| 4,695,326 | 9/1987 | Takazoe et al. | 127/30 |
| 4,728,515 | 3/1988 | Patel et al. | 426/3 |
| 4,737,366 | 4/1988 | Gergely et al. | 426/5 |
| 4,741,905 | 5/1988 | Huzinec | 426/3 |
| 4,765,991 | 8/1988 | Cherukuri et al. | 426/3 |
| 4,786,722 | 11/1988 | Zehner | 536/1.1 |
| 4,792,453 | 12/1988 | Reed et al. | 426/5 |
| 4,794,003 | 12/1988 | Cherukuri et al. | 426/6 |
| 4,802,924 | 2/1989 | Woznicki et al. | 427/3 |
| 4,804,544 | 2/1989 | Cherukuri et al. | 426/5 |
| 4,816,265 | 3/1989 | Cherukuri et al. | 426/5 |
| 4,872,884 | 10/1989 | Cherukuri et al. | 426/3 |
| 4,889,727 | 12/1989 | Dave et al. | 426/3 |
| 4,931,294 | 6/1990 | Yatka et al. | 426/3 |
| 4,933,188 | 6/1990 | Cherukuri et al. | 426/3 |
| 4,938,971 | 7/1990 | Chapdelaine et al. | 426/3 |
| 4,948,596 | 8/1990 | Bunick et al. | 426/3 |
| 4,954,353 | 9/1990 | Cherukuri et al. | 426/5 |
| 4,961,935 | 10/1990 | Cherukuri et al. | 426/3 |
| 4,971,787 | 11/1990 | Cherukuri et al. | 414/48 |
| 4,971,806 | 11/1990 | Cherukuri et al. | 426/5 |
| 4,975,287 | 12/1990 | Zibell et al. | 426/3 |
| 4,978,751 | 12/1990 | Biton et al. | 536/123 |
| 4,980,177 | 12/1990 | Cherukuri et al. | 426/3 |
| 4,983,405 | 1/1991 | Cherukuri et al. | 426/3 |
| 4,986,991 | 1/1991 | Yatka et al. | 426/3 |
| 5,009,900 | 4/1991 | Levine et al. | 426/96 |
| 5,023,093 | 6/1991 | Cherukuri et al. | 426/3 |
| 5,039,530 | 8/1991 | Yatka et al. | 426/3 |
| 5,041,294 | 8/1991 | Patel | 426/3 |
| 5,059,429 | 10/1991 | Cherukuri et al. | 426/3 |
| 5,066,511 | 11/1991 | Cherukuri et al. | 426/658 |
| 5,082,671 | 1/1992 | Cherukuri | 426/3 |
| 5,085,872 | 2/1992 | Patel et al. | 426/4 |
| 5,087,459 | 2/1992 | Chuu et al. | 426/4 |
| 5,100,678 | 3/1992 | Reed et al. | 426/3 |
| 5,120,550 | 6/1992 | Van der Schueren | 426/3 |
| 5,139,798 | 8/1992 | Yatka et al. | 426/5 |
| 5,165,943 | 11/1992 | Patel et al. | 426/3 |
| 5,165,944 | 11/1992 | Song et al. | 426/5 |
| 5,167,972 | 12/1992 | Greenberg et al. | 426/3 |
| 5,169,657 | 12/1992 | Yatka et al. | 426/5 |
| 5,169,658 | 12/1992 | Yatka et al. | 426/5 |
| 5,171,589 | 12/1992 | Richey et al. | 426/5 |
| 5,178,889 | 1/1993 | Reed et al. | 426/3 |
| 5,192,562 | 3/1993 | Grey et al. | 426/4 |

FOREIGN PATENT DOCUMENTS

| | | | |
|---|---|---|---|
| 0252874 | 1/1988 | European Pat. Off. | A23G 3/30 |
| 0301628 | 2/1989 | European Pat. Off. | C12N 9/10 |
| 0325090 | 7/1989 | European Pat. Off. | A23G 3/30 |
| 0337889 | 10/1989 | European Pat. Off. | A23G 1/236 |
| 0351972 | 1/1990 | European Pat. Off. | A23G 3/30 |
| 0351973 | 1/1990 | European Pat. Off. | A23L 1/236 |
| 0368451 | 5/1990 | European Pat. Off. | C08B 30/18 |
| 0390438 | 10/1990 | European Pat. Off. | A23G 3/00 |
| 0397027 | 11/1990 | European Pat. Off. | A01N 43/08 |
| 0421670 | 4/1991 | European Pat. Off. | A23G 3/30 |
| 0425115 | 5/1991 | European Pat. Off. | A23G 3/30 |
| 0438912 | 7/1991 | European Pat. Off. | A23L 1/308 |
| 0449594 | 10/1991 | European Pat. Off. | A23L 1/0526 |
| 0457098 | 11/1991 | European Pat. Off. | A23L 1/307 |
| 0472428 | 2/1992 | European Pat. Off. | A23G 3/30 |
| 0566174 | 10/1993 | European Pat. Off. | A23G 3/30 |
| 2626583 | 8/1989 | France | C12P 19/44 |
| 2115461 | 3/1971 | Germany | A23G 3/30 |
| 58-138355 | 8/1983 | Japan | A23L 1/236 |
| 60-224449 | 11/1985 | Japan | A23G 3/30 |
| 61-173748 | 6/1986 | Japan | A23G 3/30 |
| 62-146562 | 6/1987 | Japan | A23G 3/30 |
| 62-148496 | 7/1987 | Japan | C07H 15/4 |
| 1-19860 | 4/1989 | Japan | A23G 3/30 |
| 2-100695 | 4/1990 | Japan | C12P 19/14 |
| 2-154664 | 6/1990 | Japan | A23L 1/308 |
| 3-20301 | 1/1991 | Japan | C08B 37/00 |
| 3-47831 | 7/1991 | Japan | A23L 3/308 |
| 3-47832 | 7/1991 | Japan | A23L 1/308 |
| 347376 | 4/1931 | United Kingdom . | |
| 378073 | 8/1932 | United Kingdom | A23G 3/30 |
| 2063268 | 11/1979 | United Kingdom | C13K 13/00 |
| 2066639 | 11/1979 | United Kingdom | A23L 1/236 |
| 84-01693 | 5/1984 | WIPO | A23G 3/30 |
| 89-03170 | 4/1989 | WIPO . | |
| 90-06061 | 6/1990 | WIPO | A23G 3/30 |
| 90-06317 | 6/1990 | WIPO | C07H 15/04 |
| 90-07859 | 7/1990 | WIPO . | |
| 90-07864 | 7/1990 | WIPO . | |
| 91-03147 | 3/1991 | WIPO . | |
| 92-10943 | 7/1992 | WIPO | A23G 3/30 |

WAX-FREE CHEWING GUM WITH IMPROVED PROCESSING PROPERTIES

RELATED APPLICATIONS

This application is a continuation-in-part of International Application No. PCT/US92/11317, filed on Dec. 30, 1992, which in turn is a continuation-in-part of PCT/US92/09615, filed on Nov. 6, 1992, which in turn is a continuation-in-part of PCT/US92/01686, filed on Mar. 3, 1992. All of these applications are incorporated herein by reference.

1. Field of the Invention

The present invention relates to a method of making a wax-free chewing gum having improved processability and chewing texture, and to improved wax-free chewing gums prepared by this method.

2. Bacground of the Invention

U.S. Pat. No. 3,984,574, issued to Comollo, discloses an abhesive chewing gum base in which the non-tack properties were achieved by eliminating conventional chewing gum base ingredients which were found to contribute to chewing gum tackiness, and by substituting non-tacky ingredients in place of the conventional ingredients. Specifically, it was discovered that three classes of materials account for conventional chewing gum tackiness. These materials are elastomers, resins, and waxes.

Comollo eliminated natural and some synthetic elastomers from chewing gum base, and substituted in their place one or more non-tacky synthetic elastomers such as polyisobutylene, polyisoprene, isobutylene-isoprene copolymer and butadiene-styrene copolymer. Comollo also eliminated the tack-producing natural resins and modified natural resins and used instead relatively high amounts of hydrogenated or partially hydrogenated vegetable oils or animal fats. Finally, Comollo completely excluded waxes from the gum base, but included polyvinyl acetate, fatty acids, and mono and diglycerides of fatty acids.

The patent to Comollo relates only to non-tack chewing gums and gum bases, and not to wax-free chewing gums in general. Ordinarily, the wax used in chewing gums (including gum bases) acts as a plasticizing softener (also called an extender) for the elastomer in the chewing gum base. A plasticizing softener is a material which both plasticizes and softens the elastomer in the gum base, causing the elastomer to become more "relaxed" and compatible with the remaining chewing gum ingredients. It is believed that a plasticizing softener such as wax helps to solubilize the elastomer in the gum base, thereby improving its flowability and miscibility with other chewing gum ingredients.

When a previously wax-containing gum base formulation is modified by eliminating the wax, the resulting chewing gum product will often exhibit a property known as "short texture". The term "short texture" refers to chewing gum behavior when there is no plasticization, or not enough plasticization, of the elastomer in the gum base. A chewing gum stick having a short texture will easily break, and will not significantly stretch, when the chewing gum stick is bent or otherwise deformed, such as by pulling its ends away from each other. During manufacture, chewing gum having short texture may easily crack or break during extrusion, sheeting, scoring and cutting.

During chewing, a gum exhibiting short texture has an undesirable bite and mouth feel whereby the gum "bites" and "chews" more like a jelly or a candle, and less like a rubber band. Thus, a short-textured chewing gum is easily broken and separated, whether during processing, handling or chewing.

Presently, there is a trend in the chewing gum industry toward providing chewing gum products which are free of conventional hydrocarbon-containing waxes. However, this transition is not simple due to the fact that most commercially available chewing gum products contain waxes, and most of these products are quite appealing and acceptable to chewing gum consumers. Therefore, there is a need or desire in the chewing gum industry for a way to modify conventional wax-containing chewing gums by removing the waxes, without causing short texture or otherwise significantly changing the physical properties of the chewing gums, and without requiring extensive research and experimentation.

SUMMARY OF THE INVENTION

The present invention is directed to a method of making a wax-free chewing gum wherein the "starting point" is a previously wax-containing chewing gum formula, without causing short texture or other significant changes in the physical or chewing properties of the gum. The wax-free chewing gums prepared according to the invention will preferably not be recognizably different, from a consumer standpoint, from corresponding wax-containing chewing gums. In other words, the invention is directed toward a simple method of replacing a large number of conventional wax-containing chewing gums, with corresponding wax-free compositions. The term "wax" as used herein, refers to all mineral hydrocarbon-containing waxes.

For the most part, the waxes present in conventional chewing gums have been added during the manufacture of the chewing gum bases. Typically, chewing gum bases are manufactured separately from the ultimate chewing gum products. Often, chewing gum bases are manufactured in a different plant, in a different city, or even by a different company before being shipped to the location where they will be added into the chewing gum products. Thus, replacement of wax-containing chewing gums was previously considered difficult and complicated because a two-stage research and development program was required for each chewing gum product. First, a series of efforts was required on the part of gum base engineers and scientists to try to develop a wax-free gum base having the same physical properties as the corresponding wax-containing gum base. Then, a second series of efforts was required on the part of chewing gum engineers and scientists to try to assure that a chewing gum produced using the new wax-free gum base had the same processing and chewing properties as the corresponding chewing gum with the wax-containing gum base.

The present invention overcomes these difficulties by providing a method of "standardizing" the chewing gum properties which requires a minimum of effort only at the chewing gum stage of manufacture, and which requires little or no effort at the gum base stage of manufacture. The inventors have discovered that certain compounds can serve effectively as plasticizer softeners for the elastomer in the chewing gum base without requiring addition during manufacture of the gum base. These compounds need only be added during the manufacture of the chewing gum products in order to perform the functions of waxes previously added to the gum bases. Thus, while these compounds can be added during manufacture of the gum base, it is not necessary to do so, and the total amount of research and experimentation required to replace a wax-containing gum with a wax-free gum can be substantially reduced.

The compounds which have been found to serve effectively as plasticizer softeners for the gum base elastomer, and which require addition only during chewing gum manufacture, are listed as follows:

1. Triacetin
2. Tributyrin
3. Distilled monoglycerides (defined as containing at least 90 weight percent monoglycerides and lesser quantities of diglycerides and triglycerides)
4. Low and medium chain triglycerides (defined as containing 6–14 carbon atoms)
5. Acetylated monoglycerides
6. Glycerol monostearate
7. Sucrose fatty acid esters
8. Lecithin One or more of the foregoing extenders can generally be added to the chewing gum in an incremental amount of about 0.02–2.0% by weight of the wax-free chewing gum, in order to obtain processing and chewing properties similar to a corresponding wax-containing gum. By "incremental amount" it is meant that the amount of extender added may or may not be in addition to an amount already present in the corresponding wax-containing gum. For instance, a wax-containing gum may already contain a quantity of glycerol monostearate as a softener. The invention relates only to the additional amount of extender which is required to convert from a wax-containing gum to a corresponding wax-free gum, without sacrificing processing or chewing properties.

With the foregoing in mind, it is a feature and advantage of the invention to provide a simple method of converting from a wax-containing chewing gum to a corresponding wax-free chewing gum without causing short texture or otherwise compromising processing or chewing properties of the gum.

It is also a feature and advantage of the invention to provide a method of converting from a wax-free chewing gum to a corresponding wax-containing gum without requiring excessive research and experimentation.

It is also a feature and advantage of the invention to provide a method which can be used systematically to convert a large number of wax-containing chewing gum compositions to corresponding wax-free compositions.

It is also a feature and advantage of the invention to provide a wax-free chewing gum composition which does not exhibit short texture and which has physical properties similar to a corresponding wax-containing gum.

The foregoing and other features and advantages of the invention will become further apparent from the following detailed description of the presently preferred embodiments, when read in conjunction with the accompanying examples. It should be understood that the detailed description and examples are illustrative rather than limitative, the scope of the present invention being defined by the appended claims and equivalents thereof.

DETAILED DESCRIPTION OF THE PRESENTLY PREFERRED EMBODIMENTS

The method of the invention uses, as a starting point, a conventional wax-containing chewing gum formulation. First, the wax is eliminated from the chewing gum formulation. If the wax initially present in the chewing gum is added during manufacture of the chewing gum base, as is the typical case, then the gum base can be reformulated to contain the same ingredients as before, in the same relative proportions with respect to each other, except that wax is excluded. If the wax initially present in the chewing gum is added during manufacture of the chewing gum, then the chewing gum can be reformulated to contain the same ingredients as before, in the same relative proportions, except that wax is excluded.

Next, a sufficient incremental amount of extender is added to the chewing gum in order to provide the chewing gum with substantially the same physical properties, including processing and chewing properties, that existed previously. The term "extender" is defined herein as including the enumerated list of plasticizer softeners provided in the SUMMARY OF THE INVENTION, i.e., triacetin, tributyrin, distilled monoglycerides, low and medium chain triglycerides, acetylated monoglycerides, glycerol monostearate, sucrose fatty acid esters, and lecithin.

The preferred extenders are triacetin, tributyrin, distilled monoglycerides, low and medium chain triglycerides, acetylated monoglycerides, and combinations thereof. The most preferred extenders are triacetin, tributyrin, and combinations thereof. Triacetin is particularly useful in chewing gums having high levels of polyvinyl acetate in the base, for example, bubble gum bases.

The optimum amount of extender for a given wax-free chewing gum can be determined using a simple trial-and-error technique. A selected incremental amount of extender, for example, 0.1 percent, can initially be added to the gum. Then, in subsequent runs, the amount of extender can be raised or lowered in smaller steps until the optimum level is determined.

Comparison of the wax-free chewing gum product with the original wax-containing chewing gum product can be made during manufacture (extruding, sheeting, scoring, cutting, etc.), after manufacture but before chewing, and/or during chewing. For example, if a wax-free chewing gum exhibits short texture (as is often the case), the chewing gum may crack or break during extrusion, sheeting, scoring or cutting, may easily break when in the form of a finished stick, or may "bite" and "chew" like a candle or a jelly. The extender can be added during the mixing of the chewing gum ingredients, at different levels, until the processing problems cease and the wax-free chewing gum extrudes, sheets, scores and cuts like the corresponding wax-containing chewing gum.

Alternatively, wax-free chewing gum sticks containing different levels of extender can be pulled apart at the ends. Wax-free chewing gum sticks having no extender or too little extender will break apart more easily than the corresponding wax-containing chewing gum sticks. Chewing gum sticks having the right amount of extender will stretch and pull to about the same degree as the wax-containing chewing gum sticks and will not break more easily.

Alternatively, the wax-free chewing gum sticks containing different levels of extender can be tested by chewing. Wax-free chewing gum sticks having no extender or too little extender will be easier to break apart in the mouth than the corresponding wax-containing gum sticks, and will "bite" and "chew" more like a candle or a jelly, and less like a rubber band. Chewing gum sticks having the right amount of extender will have about the same mouth feel, including the same "bite" and "chew" as the wax-containing gum sticks.

The optimum incremental amount of extender is generally between about 0.02–2.0% by weight of the chewing gum, and is more commonly between about 0.1–1.0% by weight of the chewing gum. If the incremental amount of extender is too low, then the wax-free chewing gum will not exhibit sufficient improvement during processing or chewing. If the incremental amount of extender is too high, then the elastomer in the gum base will experience too much plasticization, and the chewing gum will become too soft and sticky. A recommended procedure is to begin by adding about 0.1% extender to the wax-free gum to compensate for the lost wax. From this point, the extender content can be raised or lowered, in smaller increments, until the wax-free chewing gum processes and chews like the corresponding wax-containing gum.

Other tests may also be employed for the purpose of comparing wax-free gum samples with the corresponding wax-containing gum. However, it should be emphasized that the primary objective of the invention is to have the wax-free gum perceived by the consumers as being similar to the corresponding wax-containing gum. Therefore, the most important tests are the subjective ones such as the hand pulling test and the chewing test, because these tests correspond directly to properties which are experienced and noticed by the consumers. The more obscure differences between wax-free and wax-containing chewing gums such as, for instance, properties that can only be measured using instruments, are considered to be of little significance unless these properties can be correlated with something that is noticed by consumers.

It is believed that the method of the invention is useful for converting any wax-containing gum into a wax-free gum having similar processing and chewing properties. Conventional wax-containing gums, and the corresponding wax-free gums of the invention, include a water soluble bulk portion, a water insoluble gum base portion, and one or more flavoring agents. The water soluble bulk portion dissipates in the mouth during chewing along with part of the flavoring agents. The water insoluble gum base remains in the mouth throughout the chewing process.

Conventional wax-containing gums usually contain about 1–5 weight percent wax. Typical waxes include synthetic (e.g. polyethylene) waxes, natural (e.g. candelilla, carnauba, beeswax and rice bran) waxes, and petroleum (e.g. microcrystalline and paraffin) waxes. Typically, the waxes are added during manufacture of the gum base, and can constitute up to about 30 weight percent of the gum base.

The wax-free chewing gums produced according to the invention utilize gum bases free of mineral hydrocarbon waxes. The wax-free gum base constitutes about 5–95 weight per cent of the chewing gum, more typically 10–50 weight per cent of the chewing gum, and most commonly 20–35 weight per cent of the chewing gum. The chewing gum base may contain about 20 to about 60 weight per cent synthetic elastomer, 0 to about 30 weight per cent natural elastomer, about 5 to about 55 weight per cent elastomer plasticizer, about 4 to about 35 weight per cent filler, about 5 to about 35 weight per cent softener, and optional minor amounts (about one per cent or less) of miscellaneous ingredients such as colorants, antioxidants, etc.

Synthetic elastomers may include, but are not limited to, polyisobutylene with GPC molecular weight of about 10,000 to about 95,000, isobutylene-isoprene copolymer (butyl elastomer), styrene-butadiene copolymers having styrene-butadiene ratios of about 1:3 to about 3:1, polyvinyl acetate having GPC molecular weight of about 2,000 to about 90,000, polyisoprene, polyethylene, vinyl acetate-vinyl laurate copolymer having vinyl laurate content of about 5 to about 50 percent by weight of the copolymer, and combinations thereof.

Preferred ranges are, for polyisobutylene, 50,000 to 80,000 GPC molecular weight, for styrene-butadiene, 1:1 to 1:3 bound styrene-butadiene, for polyvinyl acetate, 10,000 to 65,000 GPC molecular weight with the higher molecular weight polyvinyl acetates typically used in bubble gum base, and for vinyl acetate-vinyl laurate, a vinyl laurate content of 10–45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, chiquibul, crown gum, pendare, venezuelau chicle, leche de vaca, niger gutta, tunu, chilte and combinations thereof. The preferred natural elastomers are jelutong, chicle, sorva and massaranduba balata. The preferred elastomers and elastomer concentrations vary depending on whether the chewing gum in which the base is used is abhesive or conventional, bubble gum or regular gum, as discussed below.

Elastomer plasticizers may include, but are not limited to, natural rosin esters such as glycerol esters of partially hydrogenated rosin, glycerol esters of polymerized rosin, glycerol esters of partially dimerized rosin, glycerol esters of rosin, glycerol ester of tall oil rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; natural terpene resin; and any suitable combinations of the foregoing. The preferred elastomer plasticizers will also vary depending on the specific application, and on the type of elastomer which is used. For example, use of terpene resin to wholly or partially replace ester gums will cause the gum base to be less tacky.

Again, the term "wax-free" as used herein refers to the exclusion of waxes which contain mineral hydrocarbons. Natural waxes such as carnauba wax, bees wax, rice bran wax, and candelilla wax do not contain mineral hydrocarbons and are therefor acceptable for use in the chewing gum base and chewing gums prepared therefrom. However, the preferred chewing gums and gum bases preferably contain less than 5% natural wax by weight of the .gum base, and must preferably contain no natural wax.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), lanolin, diacetin, and combinations thereof. Hydrogenated vegetable oils are generally preferred, either alone or in combination with other softeners.

Colorants and whiteners may include FD&C-type dyes and lakes, fruit and vegetable extracts, titanium dioxide, cocoa powder and combinations thereof.

The wax-free gum base may also contain optional ingredients such as antioxidants. Synthetic antioxidants may include butylated hydroxyanisole (BHA), butylated hydroxy-toluene (BHT) and tertiary, butyl hydroquinone (TBHQ). Natural antioxidants may include tocopherols, mixed tocopherols, eugenol, gum guaiac, thymol, carvacrol, and spice extracts of thyme, oregano, rosemary, nutmeg, ginger and mixtures thereof. The usage level will depend on the antioxidant selected but will generally be at or above the level of maximum effectiveness.

When the wax-free gum base is to be used in a regular (non-bubble) gum which has at least some abhesive (reduced tack) characteristics, the base should contain about 10 to about 40 weight per cent synthetic elastomer, about 15 to about 30 weight per cent elastomer plasticizer, about 5 to about 30 weight per cent filler, about 15 to about 35 weight per cent softener, 0 to about 1 weight per cent colorant and 0 to about 0.1 weight per cent antioxidant. Specific embodiments of the wax-free gum base are provided in Examples 1–30 below.

TABLE 1

Wax-Free Gum Bases For Use In Chewing Gum Having Some Reduced Tack Characteristics (Examples 1-30)

| GENERIC INGREDIENTS | EXAMPLES 1-5 | | | | | EXAMPLES 6-10 | | | | | EXAMPLES 11-15 | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| ** SYNTHETIC ELASTOMER ** | | | | | | | | | | | | | | | |
| STYRENE-BUTADIENE ELASTOMER | 5.3 | — | 2.1 | 1.3 | 1.8 | — | — | — | 5.2 | 2.1 | 4.3 | 5.9 | 3.9 | — | 2.1 |
| BUTYL (ISOPRENE-ISOBUTYLENE) ELASTOMER | 8.6 | 7.9 | 7.2 | 14.8 | — | 8.1 | 14.6 | 9.4 | 4.1 | 7.2 | 6.2 | 6.9 | 5.3 | 9.3 | 6.0 |
| POLYISOBUTYLENE ELASTOMER | 7.1 | — | 7.4 | 5.2 | 24.8 | 3.6 | 1.2 | 13.0 | 5.9 | 7.3 | 6.4 | 2.0 | 12.7 | 12.1 | 8.5 |
| POLYVINYL ACETATE | 10.5 | 27.2 | 15.3 | 12.1 | 10.1 | 27.5 | 26.2 | 22.3 | 25.7 | 15.3 | 21.8 | 24.8 | 14.9 | 21.4 | 15.3 |
| ** ELASTOMER PLASTICIZERS ** | | | | | | | | | | | | | | | |
| GLYCEROL ESTERS OF ROSIN | 2.1 | — | 19.0 | — | 3.7 | — | 4.9 | — | 23.5 | 19.1 | 2.6 | 8.6 | — | — | 10.1 |
| GLYCEROL ESTERS OF PART HYD ROSIN | 4.3 | 18.2 | — | 15.3 | 7.9 | — | 12.6 | — | — | — | — | 8.0 | — | — | 8.9 |
| TERPENE RESINS | 10.8 | — | — | — | 7.1 | 27.1 | — | 10.0 | 3.2 | — | 17.1 | 1.9 | 21.4 | 6.5 | — |
| ** FILLER ** | | | | | | | | | | | | | | | |
| CALCIUM CARBONATE | — | 15.9 | 20.7 | — | 17.7 | 10.9 | — | 20.0 | 15.1 | 20.7 | — | 9.9 | 13.7 | 21.4 | 20.9 |
| TALC | 25.5 | — | — | 16.7 | — | — | 13.1 | — | — | — | 14.6 | 7.2 | 1.4 | — | — |
| ** SOFTENER ** | | | | | | | | | | | | | | | |
| HYDROGENATED VEGETABLE OIL | 15.3 | 22.6 | 24.3 | 28.4 | 21.0 | 14.3 | 16.6 | 20.7 | 12.2 | 24.3 | 19.5 | 21.1 | 18.7 | 25.2 | 24.2 |
| GLYCEROL MONOSTEARATE | 8.2 | 7.4 | 4.0 | 5.1 | 3.5 | 4.8 | 9.6 | 4.6 | 5.1 | 4.0 | 4.4 | 3.7 | 5.7 | 4.1 | 4.0 |
| LECITHIN | 2.3 | 0.8 | — | 1.1 | 2.4 | 3.7 | 1.2 | — | — | — | 3.1 | — | 2.3 | — | — |
| TOTAL PERCENT | 100.0 | 100.0 | 100.0 | 100.0 | 100.0 | 100.0 | 100.0 | 100.0 | 100.00 | 100.0 | 100.0 | 100.0 | 100.0 | 100.0 | 100.0 |

| GENERIC INGREDIENTS | EXAMPLES 16-20 | | | | | EXAMPLES 21-25 | | | | | EXAMPLES 26-30 | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| ** SYNTHETIC ELASTOMER ** | | | | | | | | | | | | | | | |
| STYRENE-BUTADIENE ELASTOMER | 1.6 | — | 2.7 | — | — | — | 1.4 | 3.2 | — | 4.1 | — | — | — | — | — |
| BUTYL (ISOPRENE-ISOBUTYLENE) ELASTOMER | 3.7 | 8.1 | 2.3 | 8.9 | 3.6 | 7.4 | 8.4 | 7.3 | 8.8 | 11.3 | 10.0 | 9.2 | 2.4 | 8.3 | 8.8 |
| POLYISOBUTYLENE ELASTOMER | 6.8 | 3.6 | 14.2 | 10.0 | 11.1 | 1.9 | 1.6 | 7.5 | 3.5 | 7.9 | 1.9 | 6.3 | 8.4 | 3.6 | 2.3 |
| POLYVINYL ACETATE | 22.3 | 27.3 | 17.3 | 21.3 | 21.9 | 24.8 | 23.1 | 21.1 | 27.9 | 18.2 | 27.6 | 13.1 | 20.5 | 27.5 | 27.4 |
| ** ELASTOMER PLASTICIZERS ** | | | | | | | | | | | | | | | |
| GLYCEROL ESTERS OF ROSIN | 9.9 | — | — | — | 19.6 | — | 13.1 | 15.3 | — | — | — | — | — | — | — |
| GLYCEROL ESTERS OF PART HYD ROSIN | 4.3 | — | 27.3 | — | 11.2 | — | 22.1 | 2.4 | — | 26.2 | — | 19.9 | — | — | — |
| TERPENE RESINS | 11.6 | 26.9 | — | 9.7 | 3.7 | 25.8 | 3.6 | 5.8 | 27.4 | 1.4 | 25.3 | — | 23.5 | 25.3 | 28.3 |
| ** FILLER ** | | | | | | | | | | | | | | | |
| CALCIUM CARBONATE | — | 11.3 | — | 21.5 | 6.4 | 18.6 | — | — | 11.9 | 13.6 | 11.3 | 22.3 | — | 11.3 | 12.5 |
| TALC | 17.2 | — | 8.2 | — | — | — | 7.3 | 14.8 | — | — | — | — | 15.6 | — | — |
| ** SOFTENER ** | | | | | | | | | | | | | | | |
| HYDROGENATED VEGETABLE OIL | 17.8 | 14.3 | 22.4 | 23.2 | 19.2 | 12.3 | 11.3 | 19.8 | 12.3 | 8.2 | 15.4 | 18.6 | 19.2 | 16.5 | 12.5 |

TABLE 1-continued

Wax-Free Gum Bases For Use In Chewing Gum Having
Some Reduced Tack Characteristics (Examples 1-30)

| | | | | | | | | | | | | | | | |
|---|---|---|---|---|---|---|---|---|---|---|---|---|---|---|---|
| GLYCEROL MONOSTEARATE | 4.8 | 4.8 | 2.7 | 5.4 | 3.3 | 4.4 | 4.4 | 2.8 | 4.7 | 5.2 | 4.8 | 10.6 | 8.9 | 4.8 | 4.7 |
| LECITHIN | — | 3.7 | 2.9 | — | — | 4.8 | 3.7 | — | 3.5 | 3.9 | 3.7 | — | 1.5 | 2.7 | 3.5 |
| TOTAL PERCENT | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |

When the wax-free gum base is to be used in a regular (non-bubble) gum which does not have abhesive characteristics, the base should contain about 12 to about 30 weight per cent natural elastomer, about 20 to about 40 weight per cent synthetic elastomer, about 4 to about 25 weight per cent elastomer plasticizer, about 5 to about 25 weight per cent filler, about 15 to about 30 weight per cent softener, 0 to about 1 weight per cent colorant and 0 to about 0.1 weight per cent antioxidant. Specific embodiments of the wax-free gum base fitting this description are provided in Examples 31-55 below:

TABLE 2

Wax-Free Gum Bases For Use
In Chewing Gum Not Having Reduced Tack (Examples 31-55)

| | IDENTIFICATION - EXAMPLE #: | | | | | | | | | | | |
|---|---|---|---|---|---|---|---|---|---|---|---|---|
| | EXAMPLES 31-34 | | | | EXAMPLES 35-38 | | | | EXAMPLES 39-42 | | | |
| GENERIC INGREDIENTS | 31 | 32 | 33 | 34 | 35 | 36 | 37 | 38 | 39 | 40 | 41 | 42 |
| ** NATURAL ELASTOMER ** | | | | | | | | | | | | |
| NATURAL GUM | 22.0 | 26.5 | 23.4 | 25.1 | 22.8 | 18.2 | 23.5 | 17.6 | 12.9 | 18.5 | 15.7 | 22.6 |
| ** SYNTHETIC ELASTOMER ** | | | | | | | | | | | | |
| STYRENE-BUTADIENE ELASTOMER | — | — | — | 1.9 | 2.6 | — | — | — | — | — | 1.9 | — |
| BUTYL (ISOPRENE-ISOBUTYLENE) ELASTOMER | 4.8 | 7.1 | 5.6 | 2.1 | 4.1 | 6.9 | 8.8 | 10.2 | 9.1 | 6.4 | 3.7 | 5.8 |
| POLYISOBUTYLENE ELASTOMER | 5.7 | 5.6 | 3.0 | 4.7 | 3.2 | 5.4 | 3.3 | 2.1 | 9.4 | 5.2 | 4.1 | 3.1 |
| POLYVINYL ACETATE | 16.4 | 18.7 | 19.8 | 24.8 | 16.3 | 15.2 | 12.9 | 26.9 | 10.7 | 15.4 | 26.2 | 20.4 |
| ** ELASTOMER PLASTICIZERS ** | | | | | | | | | | | | |
| GLYCEROL ESTERS OF ROSIN | 3.8 | — | — | 3.2 | 6.9 | — | 8.5 | 11.7 | 15.2 | — | — | — |
| GLYCEROL ESTERS OF PART HYD ROSIN | 12.3 | 15.3 | 15.9 | 12.6 | 11.8 | 12.5 | 5.5 | 4.8 | — | 13.2 | 15.3 | 11.7 |
| METHYL ESTERS OF ROSIN | — | — | — | 2.1 | 1.7 | 2.6 | 1.4 | — | — | 2.0 | — | 4.0 |
| TERPENE RESINS | — | — | — | — | — | — | 3.7 | — | — | — | — | — |
| ** FILLER ** | | | | | | | | | | | | |
| CALCIUM CARBONATE | — | 4.0 | 10.7 | 4.4 | 9.3 | 16.0 | — | — | 20.6 | 18.5 | 12.2 | 11.6 |
| TALC | 7.1 | — | — | — | — | — | 9.3 | 4.6 | — | — | — | — |
| ** SOFTENER ** | | | | | | | | | | | | |
| HYDROGENATED VEGETABLE OIL | 21.8 | 18.4 | 16.8 | 12.6 | 18.2 | 16.1 | 16.2 | 15.8 | 15.8 | 13.9 | 15.1 | 17.5 |
| GLYCEROL MONOSTEARATE | 6.1 | 4.4 | 4.8 | 3.8 | — | 7.1 | 5.7 | 6.3 | 6.3 | 6.9 | 5.8 | 3.3 |
| LECITHIN | — | — | — | 2.7 | 3.1 | — | 1.2 | — | — | — | — | — |
| TOTAL PERCENT | 100.0 | 100.0 | 100.0 | 100.0 | 100.0 | 100.0 | 100.0 | 100.0 | 100.0 | 100.0 | 100.0 | 100.0 |

| | IDENTIFICATION - EXAMPLE #: | | | | | | | | | | | | |
|---|---|---|---|---|---|---|---|---|---|---|---|---|---|
| | EXAMPLES 43-46 | | | | EXAMPLES 47-50 | | | | EXAMPLES 51-55 | | | | |
| GENERIC INGREDIENTS | 43 | 44 | 45 | 46 | 47 | 48 | 49 | 50 | 51 | 52 | 53 | 54 | 55 |
| ** NATURAL ELASTOMER ** | | | | | | | | | | | | | |
| NATURAL GUM | 23.7 | 22.2 | 21.1 | 22.2 | 23.8 | 28.4 | 18.7 | 19.5 | 14.4 | 18.2 | 25.2 | 25.2 | 26.7 |
| ** SYNTHETIC ELASTOMER ** | | | | | | | | | | | | | |
| STYRENE-BUTADIENE ELASTOMER | — | — | — | — | — | — | — | — | — | — | — | — | — |
| BUTYL (ISOPRENE-ISOBUTYLENE) ELASTOMER | 6.2 | 5.7 | 6.1 | 5.7 | 3.1 | 5.4 | 6.9 | 8.2 | 9.1 | 6.8 | 2.4 | 3.5 | 3.2 |
| POLYISOBUTYLENE ELASTOMER | 5.9 | 3.1 | 2.8 | 3.1 | 7.7 | 3.1 | 5.5 | 2.7 | 3.6 | 5.4 | 4.9 | 5.7 | 6.1 |
| POLYVINYL ACETATE | 23.7 | 22.0 | 18.0 | 22.0 | 20.5 | 26.6 | 14.8 | 17.2 | 18.1 | 15.5 | 19.9 | 19.1 | 17.6 |
| ** ELASTOMER PLASTICIZERS ** | | | | | | | | | | | | | |
| GLYCEROL ESTERS OF ROSIN | — | — | 15.7 | — | — | — | — | 20.0 | 11.9 | — | 15.6 | — | — |
| GLYCEROL ESTERS OF PART HYD ROSIN | 11.3 | 15.2 | — | 13.2 | 10.4 | 11.4 | 15.5 | — | 13.0 | 12.7 | — | 15.6 | 15.6 |
| METHYL ESTERS OF ROSIN | 2.9 | — | — | 2.0 | 2.0 | — | — | — | — | 2.6 | — | — | — |
| TERPENE RESINS | 2.8 | — | — | — | 5.1 | — | — | — | — | — | 2.1 | 1.9 | — |
| ** FILLER ** | | | | | | | | | | | | | |
| CALCIUM CARBONATE | 5.6 | 11.4 | — | 11.3 | — | 9.1 | 17.9 | 9.6 | 14.1 | 15.7 | — | — | — |
| TALC | — | — | 15.4 | — | 5.3 | — | — | — | — | — | 7.1 | 6.2 | 8.0 |
| ** SOFTENER ** | | | | | | | | | | | | | |
| HYDROGENATED VEGETABLE OIL | 12.1 | 17.2 | 15.1 | 17.2 | 15.8 | 16.0 | 13.0 | 22.8 | 15.8 | 16.0 | 18.4 | 18.4 | 18.4 |
| GLYCEROL MONOSTEARATE | 5.8 | 3.3 | 5.8 | 3.3 | 6.3 | — | 7.7 | — | — | 7.1 | 4.4 | 4.4 | 2.8 |
| LECITHIN | — | — | — | — | — | — | — | — | — | — | — | — | 1.6 |
| TOTAL PERCENT | 100.0 | 100.0 | 100.0 | 100.0 | 100.0 | 100.0 | 100.0 | 100.0 | 100.0 | 100.0 | 100.0 | 100.0 | 100.0 |

When the wax-free gum base is to be used in a bubble gum, the base should contain about 30 to about 60 weight per cent synthetic elastomer, about 5 to about 55 weight per cent elastomer plasticizer, about 10 to about 35 weight per cent filler, about 5 to about 25 weight per cent softener, 0 to about 1 weight per cent colorant and 0 to about 0.1 weight per cent antioxidant. Specific embodiments of the wax-free base for use in bubble gum are provided in Examples 56–74 below.

tylene and filler. The acetylated monoglyceride may be added at the end of the process if desired and still not alter the chewing texture of the gum made from the base.

TABLE 3

Wax-Free Gum Bases For Use In Bubble Gum

| GENERIC INGREDIENTS | 56 | 57 | 58 | 59 | 60 | 61 | 62 | 63 | 64 |
|---|---|---|---|---|---|---|---|---|---|
| SYNTHETIC ELASTOMER | | | | | | | | | |
| POLYISOBUTYLENE ELASTOMER | 17.1 | 16.7 | 11.7 | 6.2 | 11.6 | 15.7 | 13.2 | 5.4 | 7.9 |
| POLYVINYL ACETATE | 24.9 | 25.6 | 29.4 | 30.9 | 31.5 | 32.1 | 33.2 | 34.8 | 34.2 |
| ELASTOMER PLASTICIZERS | | | | | | | | | |
| GLYCEROL ESTERS OF ROSIN | 6.8 | 8.0 | 10.7 | 14.6 | 19.8 | 27.4 | 22.6 | 16.3 | 14.8 |
| GLYCEROL ESTERS OF PART HYD ROSIN | — | — | — | — | — | — | — | — | — |
| FILLER | | | | | | | | | |
| CALCIUM CARBONATE | — | — | — | — | — | — | — | 30.2 | 29.8 |
| TALC | 34.7 | 34.9 | 34.1 | 34.0 | 21.9 | 10.1 | 17.3 | — | — |
| SOFTENER | | | | | | | | | |
| GLYCERYL TRIACETATE | 4.6 | 3.9 | 4.4 | 4.7 | 5.0 | 4.9 | 5.0 | 5.3 | 5.3 |
| GLYCEROL MONOSTEARATE | 5.8 | 5.7 | 4.3 | 4.6 | 4.9 | 4.7 | 4.1 | 5.9 | 5.0 |
| ACETYLATED MONOGLYCERIDE | 6.1 | 5.2 | 5.4 | 5.0 | 5.3 | 5.1 | 4.6 | 2.1 | 3.0 |
| TOTAL PERCENT | 100.0 | 100.0 | 100.0 | 100.0 | 100.0 | 100.0 | 100.0 | 100.0 | 100.0 |

| GENERIC INGREDIENTS | 65 | 66 | 67 | 68 | 69 | 70 | 71 | 72 | 73 | 74 |
|---|---|---|---|---|---|---|---|---|---|---|
| SYNTHETIC ELASTOMER | | | | | | | | | | |
| POLYISOBUTYLENE ELASTOMER | 17.2 | 13.0 | 11.6 | 11.6 | 7.9 | 11.6 | 10.9 | 11.6 | 12.4 | 11.9 |
| POLYVINYL ACETATE | 37.3 | 37.1 | 39.9 | 41.2 | 34.2 | 37.8 | 37.5 | 31.4 | 31.0 | 37.0 |
| ELASTOMER PLASTICIZERS | | | | | | | | | | |
| GLYCEROL ESTERS OF ROSIN | 11.2 | — | — | — | — | — | — | — | — | — |
| GLYCEROL ESTERS OF PART HYD ROSIN | — | 19.8 | 19.9 | 19.4 | 14.8 | 19.8 | 20.6 | 19.8 | 21.1 | 20.3 |
| FILLER | | | | | | | | | | |
| CALCIUM CARBONATE | 20.6 | 16.5 | 15.0 | — | 29.8 | — | — | — | — | — |
| TALC | — | — | — | 14.0 | — | 17.0 | 19.5 | 22.7 | 22.2 | 16.7 |
| SOFTENER | | | | | | | | | | |
| GLYCERYL TRIACETATE | 5.6 | 5.6 | 6.0 | 6.2 | 5.3 | 5.6 | 5.2 | 5.8 | 4.3 | 5.7 |
| GLYCEROL MONOSTEARATE | 8.1 | 8.0 | 7.6 | 7.6 | 5.0 | 3.2 | 3.1 | 2.9 | 2.5 | 4.5 |
| ACETYLATED MONOGLYCERIDE | — | — | — | — | 3.0 | 5.0 | 3.2 | 5.8 | 6.5 | 3.9 |
| TOTAL PERCENT | 100.0 | 100.0 | 100.0 | 10.00 | 100.0 | 100.0 | 100.0 | 100.0 | 100.0 | 100.0 |

The gum base is typically prepared by adding an amount of the elastomer, elastomer plasticizers and filler to a heated sigma blade mixer with a front to rear blade speed ratio of typically 2:1. The initial amounts of ingredients are determined by the working capacity of the mixing kettle in order to attain a proper consistency. After the initial ingredients have massed homogeneously, the balance of the elastomer plasticizer, filler, softeners, etc. are added in a sequential manner until a completely homogeneous molten mass is attained. This can usually be achieved in one to four hours, depending on the formulation. The final mass temperature can be between 60° C. and 150° C., more preferably between 80° C. and 120° C. The completed molten mass is emptied from the mixing kettle into coated or lined pans, extruded or cast into any desirable shape and allowed to cool and solidify.

Although the above method for making base is typical and applies to both chewing and bubble bases, it has been found that there is a preferred method for making bubble gum bases.

First, all of the polyvinyl acetate and portions of the polyisobutylene and filler are added and blended in a heated sigma blade mixer. Softeners such as glyceryl triacetate and/or acetylated monoglyceride are then added along with a second portion of each of polyisobutylene and filler. The acetylated monoglyceride may be added at the end of the process if desired and still not alter the chewing texture of the gum made from the base.

Next, the rest of the polyisobutylene and filler are added along with the elastomer plasticizer. Finally, the remaining ingredients such as glycerol monostearate and antioxidants may be added. Colorant may be added at any time during the mixing process and is preferably added at the start.

There are some variations to the above described preferred method which in no way limits the method as described. Those skilled in the art of gum base manufacture may be able to appreciate any minor variations.

In producing wax-containing gum bases high in polyvinyl acetate, and particularly those high in high molecular weight polyvinyl acetate, it is necessary to improve blending of the ingredients by removing the heat applied to the sigma blade mixer at some point in the process. This reduces the temperature of the gum base and causes greater compatibility of its ingredients. In the preferred process for making the gum base free of wax, there is no need to remove the heat applied. The degree of incompatibility is greatly reduced since there is no wax present. Nevertheless, heat is preferably removed at about 30 minutes to about 90 minutes into the mixing time of the base production process.

In addition to the water-insoluble gum base, a typical chewing gum composition includes a water soluble bulk portion and one or more flavoring agents. The wax-free gum bases described herein can be used in any typical chewing gum composition.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, glycerol monostearate, hydroxylated lecithin, agar, carrageenan, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5–95% by weight of the chewing gum, more typically 20–80% by weight of the chewing gum and most commonly 30–60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, high maltose syrup, invert/high fructose syrup, maltotriose, glyceraldehyde, erytrose, xylose, lactose, leucrose, L-sugars, fructooligosaccharide and low calorie bulking agents such as indigestible dextrin, guar gum hydrolyzate, oligofructose, polydextrose, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, lactitol, erythritol, cellobiitol, and the like, alone or in combination.

High intensity sweeteners may also be present and are commonly used with sugarless sweeteners. When used, high intensity sweeteners typically constitute between 0,001–5% by weight of the chewing gum, preferably between 0.01–1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, stevia and the like, alone or in 3 combination.

Sweeteners and other active ingredients can be incorporated into chewing gum after being encapsulated in order to modify their release. The most common ways of modifying the release of the active ingredients include spray drying, spray chilling, fluid-bed coating, coacervation, absorption, extrusion encapsulation, and other standard encapsulating techniques. The active ingredient may be modified in a multiple step process comprising any of the processes noted.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

Flavoring agents should generally be present in the chewing gum in an amount within the range of about 0.1–15% by weight of the chewing gum, preferably between about 0.2–5% by weight of the chewing gum, most preferably between about 0.5–3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

Optional ingredients such as colors, food acidulants, emulsifiers, pharmaceutical agents, vitamins, and additional flavoring agents may also be included in chewing gum.

Finally, the wax-free chewing gums of the invention will contain additional incremental amounts of extenders as hereinbefore described, which perform the functions previously performed by the wax, of "relaxing" the elastomer in the gum base and compatibilizing the elastomer with the remaining chewing gum ingredients. As stated previously, these extenders will generally constitute, incrementally, about 0.02–2.0% by weight of the chewing gum, more commonly about 0.1–1.0% by weight of the chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Also, the incremental amount of extender as hereinbefore described, can be added at this time. Further parts of the bulk portion may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

The chewing gum can be dusted with various substances to reduce the stickiness and improve the initial taste of the gum. The material used to dust the chewing gum are referred to as "dusting compounds" or alternatively "rolling compounds," because the compounds are used to make to the gum more manageable during processing including rolling and sheeting. The rolling compound used can be selected from the group consisting of sucrose, mannitol, starch, calcium carbonate, talc, lactitol, palatinit (hydrogenated isomaltulose), lactose, and combinations thereof. To improve the flavor impact and duration of the gum, flavor, gum base, and sweetener can be added to the rolling compound.

Chewing gum products contemplated as part of the present invention are generally similar to products using traditional wax-containing bases. Many general types of products can be produced including reduced tack gums, sugarless gums, bubble gums (sugarless or sugar-containing), coated ball or pellet gums (sugarless or sugar-containing), dental health gums, breath freshening gums, novelty gums, low calorie gums and pharmaceutical gums. The products may be of any flavor, and may be processed in a variety of ways in either batch or continuous processes, and formed into any final shape including sticks, tabs, chunks, tapes, coextruded products, molded shapes, etc.

The following formulas are illustrative of types of chewing gum products which may be produced. All ingredient levels are expressed in weight percent. In the formulations given, the incremental amounts of extenders hereinbefore described have not yet been added, although the waxes have been eliminated. The reason for this is that the types and amounts of additional extender have not yet been optimized for each of the individual chewing gum formulations. Nevertheless, the following formulations are representative of formulations to which the incremental extenders can be added, in order to recover the processing and chewing properties of corresponding wax-containing chewing gums.

Examples 75-98 illustrate non-tack and reduced-tack chewing gums whose processing and chewing properties can be improved according to the present invention. As can be seen, there is much latitude in the selection of flavors sweeteners and ingredient levels. Examples 75-86 illustrate sugar gums while Examples 87-98 describe sugarless gums. Encapsulated sweeteners are used to extend sweetness and flavor and to protect the artificial sweetener from degradation during storage. Examples 89 and 91 are low moisture products having moisture levels below 2%.

TABLE 4

Sugar-Containing Non-Tack And Reduced Tack Gums

EXAMPLES 75-80

| Example | 76 | 78 | 77 | 78 | 79 | 80 |
| --- | --- | --- | --- | --- | --- | --- |
| Base Example # | 19 | 17 | 11 | 19 | 16 | 16 |
| Base % | 20.12 | 23.20 | 27.20 | 21.22 | 22.10 | 24.00 |
| Flavor | 0.20 (Spray Dried Peppermint) | 1.10 (Cinnamon) | 1.65 (Wintergreen) | 0.10 (Spray Dried Menthol) | 0.10 (Peppermint) | 0.90 (Peppermint) |
| Flavor | 0.91 (Spearmint) | — | 0.10 (Spray Dried Menthol) | 0.85 (Spearmint) | 0.90 (Spearmint) | 0.10 (Spearmint) |
| Sugar | 58.70 | 60.96 | 55.80 | 60.60 | 60.34 | 61.29 |
| Sorbitol | 1.20 | 0.68 | — | 0.68 | 0.70 | — |
| Encapsulated Acesulfame K | 0.10 | 0.30 | — | 0.30 | 0.41 | — |
| Encapsulated Aspartame | 0.10 | — | — | — | — | — |
| Calcium Carbonate | 3.10 | — | — | — | — | — |
| Corn Syrup | 13.47 | 12.11 | 13.71 | 14.80 | 14.00 | 12.10 |
| Lecithin | — | 0.15 | 0.10 | 0.15 | 0.15 | 0.20 |
| Glycerin | 2.10 | 1.50 | 1.54 | 1.30 | 1.30 | 1.41 |
| TOTAL | 100 | 100 | 100 | 100 | 100 | 100 |

EXAMPLES 81-86

| Example | 81 | 82 | 83 | 84 | 85 | 86 |
| --- | --- | --- | --- | --- | --- | --- |
| Base Example # | 6 | 11 | 20 | 22 | 13 | 16 |
| Base % | 18.72 | 22.81 | 26.01 | 19.35 | 26.00 | 24.77 |
| Flavor | 0.81 (Fruit Flavor) | 1.11 (Peppermint) | 0.97 (Spearmint Oil) | 1.21 (Cinnamon Flavor) | 1.30 (Fruit Flavor) | 1.21 (Wintergreen Flavor) |
| Flavor | — | — | 0.12 (Peppermint Oil) | 0.13 (Peppermint Oil) | — | — |
| Sugar | 57.25 | 54.86 | 51.10 | 60.31 | — | 51.85 |
| Palatinose | — | — | — | — | 49.88 | — |
| Corn Syrup | 14.26 | 11.88 | 13.70 | 14.08 | 15.07 | 13.62 |
| Dextrose | 7.28 | 8.11 | 6.37 | 3.55 | 6.11 | 7.41 |
| Lecithin | 0.13 | 0.12 | 0.10 | — | 0.05 | 0.10 |
| Glycerol Monostearate | 0.40 | — | 0.61 | — | — | — |
| Glycerin | 1.15 | 1.11 | 1.02 | 1.37 | 1.61 | 1.04 |
| TOTAL | 100 | 100 | 100 | 100 | 100 | 100 |

TABLE 5

Sugarless Non-Tack And Reduced Tack Gums

EXAMPLES 87-92

| Example | 87 | 88 | 89 | 90 | 91 | 92 |
| --- | --- | --- | --- | --- | --- | --- |
| Base Example # | 3 | 19 | 7 | 24 | 24 | 8 |
| Base % | 24.00 | 27.11 | 21.21 | 29.48 | 22.58 | 18.11 |
| Flavor | 1.07 (Citrus Oils) | 0.98 (Peppermint) | 0.97 (Spearmint Oil) | 1.15 (Peppermint Oil) | 1.47 (Cinnamon Flavor) | 1.00 (Wintergreen Oil) |
| Flavor | — | 0.20 (Spray Dried Menthol) | 0.15 (Peppermint Oil) | 0.21 (Spearmint Oil) | — | 0.27 (Peppermint Oil) |

TABLE 5-continued

Sugarless Non-Tack And Reduced Tack Gums
EXAMPLES 87-92

| Example | 87 | 88 | 89 | 90 | 91 | 92 |
|---|---|---|---|---|---|---|
| Sorbitol | 61.37 | 55.06 | 59.79 | 55.15 | 60.01 | 57.53 |
| Calcium Carbonate | — | — | 2.11 | — | 2.00 | 4.70 |
| Sorbitol Solution | 6.42 | — | — | — | — | — |
| Coevaporated Lycasin (7.5% water, 25% glycerin) | — | 9.16 | — | 8.11 | — | 8.88 |
| Glycerin | 4.70 | 4.11 | 12.11 | 3.11 | 11.61 | 7.10 |
| Mannitol | 2.10 | 3.10 | 3.11 | 2.66 | 2.00 | 2.00 |
| Encapsulated Aspartame | 0.19 | — | 0.25 | — | — | 0.21 |
| Free Aspartame | 0.05 | — | 0.10 | — | — | 0.10 |
| Encapsulated Alitame | — | 0.05 | — | 0.10 | — | — |
| Free Alitame | — | — | — | 0.03 | — | — |
| Encapsulated Sucralose | — | — | — | — | 0.21 | — |
| Free Sucralose | — | 0.08 | — | — | 0.02 | — |
| Lecithin | 0.10 | 0.15 | 0.20 | — | 0.10 | 0.10 |
| TOTAL | 100 | 100 | 100 | 100 | 100 | 100 |

TABLE 6

Reduced And Regular Tack Low Calorie Gums
EXAMPLES 93-98

| Example | 93 | 94 | 95 | 96 | 97 | 98 |
|---|---|---|---|---|---|---|
| Base Example # | 6 | 3 | 19 | 13 | 52 | 44 |
| Base % | 19.2 | 24.7 | 19.2 | 24.0 | 19.2 | 19.2 |
| Sorbitol | — | 6.0 | — | — | — | — |
| Mannitol | — | 1.0 | — | — | — | — |
| Corn Syrup | — | — | 6.0 | 24.6 | 18.5 | 6.0 |
| Dextrose | — | — | 10.0 | — | 10.0 | 10.0 |
| Lactose | — | — | 5.0 | — | — | 5.0 |
| Glycerin | 2.0 | 16.4 | 8.9 | 0.4 | 1.4 | 8.9 |
| Lecithin | — | 0.2 | — | — | — | — |
| Flavor | 1.0 | 1.4 | 0.9 | 1.0 | 0.9 | 0.9 |
| Oligofructose | — | — | 50.0 | 50.0 | — | — |
| Fructooligosaccharide | — | — | — | — | 50.0 | 50.0 |
| Color | — | 0.05 | — | — | — | — |
| Aspartame | — | 0.25 | — | — | — | — |
| High Mol. Weight Indigestible Dextrin | 57.8 | — | — | — | — | — |
| Low Mol. Weight Indigestible Dextrin | — | 50.0 | — | — | — | — |
| Indigestible Dextrin Syrup | 20.0 | — | — | — | — | — |
| TOTAL | 100 | 100 | 100 | 100 | 100 | 100 |

Examples 99-104 are sugarless products made with non-reduced-tack bases. Examples 105-110 are equivalent sugar products.

TABLE 7

Regular Tack Sugarless Gums
EXAMPLES 99-104

| Example | 99 | 100 | 101 | 102 | 103 | 104 |
|---|---|---|---|---|---|---|
| Base Example # | 32 | 44 | 61 | 36 | 52 | 44 |
| Base % | 21.76 | 22.07 | 24.00 | 20.97 | 26.00 | 20.08 |
| Flavor | 0.92 (Peppermint Oil) | 0.77 (Spearmint Oil) | 0.83 (Spearmint Oil) | 0.99 (Cinnamon Flavor) | 0.97 (Peppermint Oil) | 1.04 (Peppermint Oil) |
| Flavor | — | 0.24 (Peppermint Oil) | — | — | — | 0.16 (Spray Dried Menthol) |
| Sorbitol | 46.54 | — | — | 63.61 | 51.50 | — |
| Coevaporated Lycasin (7.5% Water, 25% Glycerin) | 8.47 | 7.84 | 11.20 | 7.76 | — | — |
| Glycerin | 5.19 | 4.91 | 2.10 | 4.20 | 12.00 | — |
| Mannitol | 1.77 | — | — | 2.01 | 3.11 | — |
| Xylitol | 15.11 | — | 12.11 | — | 6.27 | 78.16 |
| Palatinit (Hydrogenated Isomaltulose) | — | 63.97 | 49.60 | — | — | — |
| Aspartame | — | — | — | — | 0.14 | 0.14 |
| Encapsulated Aspartame | — | — | — | — | 0.22 | 0.22 |
| Alitame | — | 0.02 | 0.02 | — | — | — |
| Encapsulated Alitame | — | 0.04 | 0.04 | — | — | — |

TABLE 7-continued

Regular Tack Sugarless Gums
EXAMPLES 99–104

| Example | 99 | 100 | 101 | 102 | 103 | 104 |
|---|---|---|---|---|---|---|
| Sucralose | 0.11 | — | — | — | 0.15 | — |
| Lecithin | 0.13 | 0.14 | 0.10 | 0.10 | — | 0.20 |
| TOTAL | 100 | 100 | 100 | 100 | 100 | 100 |

TABLE 8

Regular Tack Sugar Gums
EXAMPLES 105–110

| Example | 105 | 106 | 107 | 108 | 109 | 110 |
|---|---|---|---|---|---|---|
| Base Example # | 57 | 52 | 44 | 39 | 51 | 40 |
| Base % | 22.38 | 20.60 | 20.08 | 23.11 | 20.02 | 21.01 |
| Flavor | 0.89 (Peppermint Oil) | 0.58 (Spearmint Oil) | 0.86 (Peppermint Oil) | 0.91 (Peppermint Oil) | 1.21 (Fruit Flavor) | 0.98 (Wintergreen Flavor) |
| Flavor | — | — | — | 0.21 (Spearmint Oil) | — | 0.20 (Spray Dried Menthol) |
| Encapsulated Aspartame | — | — | — | 0.10 | — | — |
| Encapsulated Acesulfame K | — | — | — | — | 0.15 | — |
| Sucralose | — | — | — | — | — | 0.09 |
| Sugar | 58.39 | 59.49 | 62.66 | 59.97 | 63.59 | 62.51 |
| Corn Syrup | 17.20 | 18.50 | 15.40 | 14.70 | 13.88 | 14.19 |
| Glycerin | 1.09 | 0.83 | 1.00 | 1.00 | 1.05 | 1.02 |
| Lecithin | 0.05 | — | — | — | .10 | — |
| TOTAL | 100 | 100 | 100 | 100 | 100 | 100 |

Examples 111–122 are examples of coated pellet gums made with non-wax bases. The gum products of these examples are formed into pellets or balls for subsequent coating. Examples 111–116 are sugar pellets which could be coated with sugar syrups. Such syrups may contain modified starch (0 to 6.0%), comparable flavors and colors (0 to 0.30%), vegetable gums such as gum arabic and cellulose derivatives such as hydroxypropyl methyl cellulose (0 to 20%) in addition to sucrose or starch hydrolysate in an aqueous solution.

Examples 117–122 are sugarless pellets which can be coated with sugar alcohol solutions such as those of sorbitol, xylitol and palatinit. These syrups may also contain the same modifiers listed above for sugar syrups.

In both cases (sugar and sugarless) dry coating agent (sugar or sugar alcohol) may be added between layers of coating syrup, a process known as dry charging or soft panning.

Coating may be carried out by any suitable process, most often using a conventional pan, side vented pans, high-capacity pans such as those made by Driam or Dumouline, or by continuous panning techniques.

TABLE 9

Sugar Pellet Gums For Coating
EXAMPLES 111–116

| Example | 111 | 112 | 113 | 114 | 115 | 116 |
|---|---|---|---|---|---|---|
| Base Example # | 40 | 36 | 37 | 51 | 52 | 47 |
| Base % | 24.32 | 24.28 | 24.30 | 24.27 | 25.17 | 24.33 |
| Flavor | 0.55 (Spearmint Oil) | 0.73 (Peppermint Oil) | 2.56 (Licorice Powder) | 0.77 (Fruit Flavor) | 0.47 (Spearmint Oil) | 0.61 (Spearmint Oil) |
| Flavor | — | — | 0.60 (Menthol/Anethol) | — | 0.15 (Peppermint Oil) | — |
| Sugar | 52.97 | 52.87 | 50.94 | 52.85 | 52.59 | 52.84 |
| Corn Syrup | 22.16 | 22.12 | 21.60 | 22.11 | 21.62 | 22.22 |
| TOTAL | 100 | 100 | 100 | 100 | 100 | 100 |

TABLE 10

Sugarless Pellet Gums For Coating
EXAMPLES 117–122

| Example | 117 | 118 | 119 | 120 | 121 | 122 |
|---|---|---|---|---|---|---|
| Base Example # | 33 | 26 | 40 | 29 | 35 | 35 |
| Base % | 31.01 | 33.00 | 32.71 | 33.03 | 30.97 | 31.45 |
| Flavor | 1.20 (Spearmint | 1.30 (Peppermint | 1.09 (Spearmint | 1.50 (Fruit Flavor) | 1.01 (Peppermint | 1.31 (Fruit Flavor) |

TABLE 10-continued

Sugarless Pellet Gums For Coating
EXAMPLES 117-122

| Example | 117 | 118 | 119 | 120 | 121 | 122 |
|---|---|---|---|---|---|---|
| Flavor | — | 0.50 (Menthol) Oil) | 0.17 (Peppermint Oil) Oil) | 0.50 (Lemon Flavor) | 0.21 (Spray Dried Menthol) Oil) | — |
| Sorbitol | 51.46 | 44.06 | 45.56 | 43.81 | 46.69 | 45.99 |
| Calcium Carbonate | 10.01 | 13.00 | 12.16 | 12.93 | 13.04 | 13.33 |
| Glycerin | 6.14 | 8.00 | 8.00 | 7.98 | 7.82 | 7.30 |
| Encapsulated Aspartame | 0.12 | 0.14 | 0.21 | 0.25 | 0.18 | 0.62 |
| Free Aspartame | 0.06 | — | 0.10 | — | 0.08 | — |
| TOTAL | 100 | 100 | 100 | 100 | 100 | 100 |

Inventive bubble gums may be prepared using wax-free bubble gum bases such as those listed in Examples 56-74. Illustrative formulations (exclusive of the incremental extenders) are given as Examples 123-134. Examples 123-128 are sugar bubble gum formulas. Note that Examples 124 and 128 use blends of two wax-free bases. This is a technique to optimize processing and texture properties while minimizing the necessity of maintaining different bases for each product and without having additional custom bases compounded. Examples 129-134 are sugarless bubble gum formulas.

TABLE 11

Sugar Bubble Gums
EXAMPLES 123-128

| Example | 123 | 124 | 125 | 126 | 127 | 128 |
|---|---|---|---|---|---|---|
| Base Example # | 69 | 72/74 | 74 | 72 | 59 | 72/69 |
| Base % | 24.02 | 11.00/11.00 | 22.20 | 20.01 | 19.99 | 9.00/13.00 |
| Flavor | 0.80 (Fruit Flavor) | 0.85 (Cream Soda) | 0.60 (Lemon Lime) | 0.60 (Blueberry) | 0.60 (Strawberry) | 0.80 (Cream Soda) |
| Flavor | — | 0.03 (Vanilla) | — | — | — | 0.02 (Vanilla) |
| Sugar | 55.10 | 59.54 | 55.95 | 59.00 | 59.75 | 57.98 |
| Corn Syrup | 17.68 | 16.53 | 19.54 | 17.99 | 16.88 | 17.44 |
| Lecithin | 0.60 | 0.35 | 0.40 | 0.51 | 0.50 | 0.45 |
| Glycerin | 1.74 | 0.70 | 0.40 | 0.81 | 1.49 | 1.31 |
| Color | 0.06 (Red) | — | 0.01 (Green) | 0.48 (Blue) | 0.08 (Red) | — |
| Citric Acid | — | — | 0.90 | 0.60 | 0.70 | — |
| TOTAL | 100 | 100 | 100 | 100 | 100 | 100 |

TABLE 12

Sugarless Bubble Gums
EXAMPLES 129-134

| Example | 129 | 130 | 131 | 132 | 133 | 134 |
|---|---|---|---|---|---|---|
| Base Example # | 63 | 64 | 89 | 71 | 71 | 60 |
| Base % | 24.00 | 24.59 | 28.00 | 29.12 | 30.10 | 26.71 |
| Flavor | 1.20 (Fruit Flavor) | 1.41 (Fruit Flavor) | 1.71 (Grape Flavor) | 1.34 (Strawberry Flavor) | 1.11 (Lemon Flavor) | 1.23 (Peach Flavor) |
| Sorbitol | 51.47 | 51.88 | 46.03 | 49.65 | 46.39 | 49.33 |
| Calcium Carbonate | 5.00 | 4.31 | — | — | — | — |
| Talc | — | — | 3.71 | 3.44 | 1.99 | 3.44 |
| Lecithin | 1.00 | 0.91 | 0.84 | 0.61 | 0.86 | 0.75 |
| Citric Acid | — | — | — | 0.31 | 0.31 | — |
| Malic Acid | — | — | 0.21 | 0.11 | 0.31 | 0.16 |
| Tarteric Acid | — | — | 0.36 | 0.11 | — | — |
| Glycerin | 17.00 | 10.00 | 9.00 | 15.09 | 8.21 | 12.00 |
| Lycasin/Glycerin | — | 6.79 | 9.61 | — | 10.41 | 6.00 |
| Color | 0.02 (Red) | 0.01 (Red) | 0.06 (Red/Blue) | 0.02 (Red) | 0.05 (Yellow) | 0.01 (Red) |
| Encapsulated Aspartame | 0.27 | — | 0.41 | — | — | 0.31 |
| Free Aspartame | 0.04 | — | 0.06 | — | 0.17 | 0.06 |
| Acesulfame K | — | — | — | 0.11 | — | — |
| Encapsulated Alitame | — | 0.10 | — | — | — | — |
| Sucralose | — | — | — | 0.09 | 0.09 | — |

TABLE 12-continued

| | Sugarless Bubble Gums | | | | | |
|---|---|---|---|---|---|---|
| | EXAMPLES 129-134 | | | | | |
| Example | 129 | 130 | 131 | 132 | 133 | 134 |
| TOTAL | 100 | 100 | 100 | 100 | 100 | 100 |

While the embodiments of the invention disclosed herein are presently considered to be preferred, various modifications and improvements can be made without departing from the spirit and scope of the invention. The scope of the invention is indicated in the appended claims, and all changes that come within the meaning and range of equivalency of the claims are intended to be embraced therein.

We claim:

1. A method of making a wax-free chewing gum having processing and chewing properties similar to a wax-containing chewing gum, comprising the steps of:
    selecting a wax-free chewing gum formulation having a composition similar to a wax-containing chewing gum except for the absence of wax;
    determining an amount of an extender higher than the amount of extender, if any, present in the wax-containing gum which is sufficient to cause the wax-free chewing gum formulation to have processing and chewing properties similar to the wax-containing chewing gum;
    modifying the wax-free chewing gum formulation to include the extender present in the higher determined amount; and
    preparing a wax-free chewing gum according to the modified formulation;
    whereby the higher amount of extender present in the wax-free chewing gum than in the corresponding wax-containing gum causes the wax-free chewing gum to extrude, sheet, score, and cut like the corresponding wax-containing gum.

2. The method of claim 1, wherein the extender comprises triacetin.

3. The method of claim 1, wherein the extender comprises tributyrin.

4. The method of claim 1, wherein the extender comprises a material selected from the group consisting of distilled monoglycerides, low and medium chain triglycerides, acetylated monoglycerides, and combinations thereof.

5. The method of claim 1, wherein the extender comprises a material selected from the group consisting of glycerol monostearate, sucrose fatty acid esters, lecithin, and combinations thereof.

6. The method of claim 1, wherein the extender is added in an incrementally higher amount of about 0.02–2.0 weight percent of the chewing gum.

7. The method of claim 1, wherein the extender is added in an incrementally higher amount of about 0.1–1.0 weight percent of the chewing gum.

8. The method of claim 1, wherein the extender is added during manufacture of the wax-free chewing gum.

9. The method of claim 1, wherein the extender is added during manufacture of a chewing gum base which is used in the wax-free chewing gum.

10. A wax-free chewing gum prepared according to the method of claim 1.

11. A method of making a wax-free chewing gum having processing and chewing properties similar to a wax-containing chewing gum, comprising the steps of:
    providing a wax-free chewing gum base having a composition similar to a wax-containing chewing gum base except for the absence of wax;
    selecting a wax-free chewing gum formulation having a composition similar to a wax-containing chewing gum expect for the absence of wax, and including the wax-free chewing gum base;
    determining an amount of an extender higher than the amount of extender, if any, present in the wax-containing gum which is sufficient to cause the wax-free chewing gum formulation to have processing and chewing properties similar to the wax-containing chewing gum;
    modifying the wax-free chewing gum formulation to include the extender present in the higher determined amount; and
    preparing a wax-free chewing gum according to the modified formulation;
    whereby the higher amount of extender present in the wax-free chewing gum than in the corresponding wax-containing gum causes the wax-free chewing gum to extrude, sheet, score and cut like the corresponding wax-containing gum.

12. The method of claim 11, wherein the extender comprises a material selected from the group consisting of triacetin, tributyrin, and combinations thereof.

13. The method of claim 11, where the extender comprises a material selected from the group consisting of distilled monoglycerides, low and medium chain triglycerides, acetylated monoglycerides, and combinations thereof.

14. The method of claim 11, wherein the extender comprises a material selected from the group consisting of glycerol monostearate, sucrose fatty acid esters, lecithin, and combinations thereof.

15. The method of claim 11, wherein the extender is added in an incrementally higher amount of about 0.02–2.0 weight percent of the chewing gum.

16. The method of claim 11, wherein the extender is added in an incrementally higher amount of about 0.1–1.0 weight percent of the chewing gum.

17. The method of claim 11, wherein the extender is added during manufacture of the wax-free chewing gum.

18. The method of claim 11, wherein the extender is added during manufacture of the wax-free chewing gum base.

19. A wax-free chewing gum prepared according to the method of claim 11.

20. A wax-free chewing gum having improved processing and chewing properties, comprising:
    a water soluble bulk portion;
    a water insoluble chewing gum base portion;
    one or more flavoring agents; and
    enough extender selected from the group consisting of triacetin, tributyrin, and combinations thereof, to cause the wax-free chewing gum to have processing and chewing properties similar to a wax-containing chewing gum;

whereby the wax-free chewing gum has a higher amount of extender than the corresponding wax-containing gum causing the wax-free chewing gum to extrude, sheet, score and cut like the corresponding wax-containing gum.

21. The wax-free chewing gum of claim 20, wherein the incremental extender comprises triacetin.

22. The wax-free chewing gum of claim 20, wherein the incremental extender comprises tributyrin.

23. A wax-free chewing gum having improved processing and chewing properties, comprising:

a formulation similar to a corresponding wax-containing chewing gum except for the absence of wax; and an extender selected from the group consisting of triacetin, tributyrin, and combinations thereof, added in an amount sufficient to cause the wax-free chewing gum to have processing and chewing properties similar to the wax-containing chewing gum;

whereby the wax-free chewing gum has a higher amount of extender than the corresponding wax-containing gum causing the wax-free chewing gum to extrude, sheet, score and cut like the corresponding wax-containing gum.

* * * * *

UNITED STATES PATENT AND TRADEMARK OFFICE
CERTIFICATE OF CORRECTION

PATENT NO. : 5,441,750
DATED : August 15, 1995
INVENTOR(S) : Steven P. Synosky et al.

It is certified that error appears in the above-indentified patent and that said Letters Patent is hereby corrected as shown below:

On the Title Page

In column 1, line 3, delete "Greenbrook;" and substitute --Greenbrook, N.J.;--.

In column 2, line 4, add the following:

4,386,106    5/1983    Merritt et al.    426/5

In the Claims

In claim 11, line 9 (column 24, line 17), delete "expect" and substitute --except--.

Signed and Sealed this

Twenty-third Day of July, 1996

Attest:

BRUCE LEHMAN

*Attesting Officer*    *Commissioner of Patents and Trademarks*